April 21, 1925.
E. O. WEATHERWAX
PISTON RING
Filed March 1, 1923
1,535,069
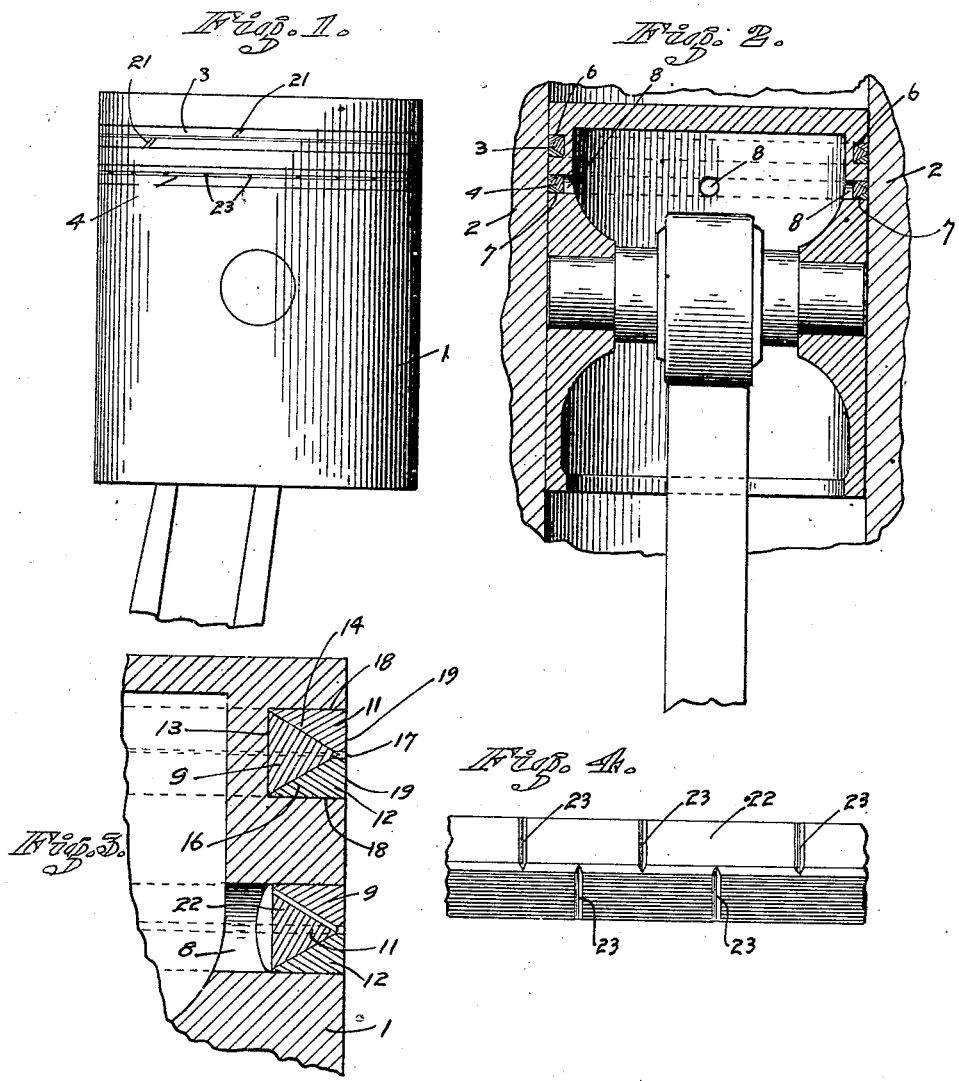
INVENTOR.
E. O. WEATHERWAX
BY 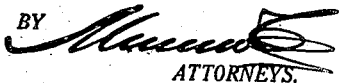
ATTORNEYS.

Patented Apr. 21, 1925.

1,535,069

UNITED STATES PATENT OFFICE.

EARL O. WEATHERWAX, OF SAN FRANCISCO, CALIFORNIA.

PISTON RING.

Application filed March 1, 1923. Serial No. 622,168.

*To all whom it may concern:*

Be it known that I, EARL O. WEATHERWAX, a citizen of the United States, and a resident of San Francisco, county of San Francisco, State of California, have invented a new and useful Piston Ring, of which the following is a specification.

The present invention relates to improvements in piston rings for internal combustion engines, and its particular object is to provide a piston ring particularly adapted to constitute a tight connection with the cylinder wall so as to hold the compression. A further object of the invention is to construct the piston ring in such a manner that a plurality of annular elements are arranged to scrape a film of oil or other substance from the cylinder wall to form a thin film between the elements whereby the latter are expanded. A further object of the invention is to provide two of these piston rings in combination, one being constructed for expansion only, while the other disposed underneath the former is adapted to carry off the oil or other substance into the interior of the piston whereby the said substance is returned to the crank case. Other objects and advantages of my device will appear as the specification proceeds.

The preferred form of my invention is illustrated in the accompanying drawing in which Figure 1 shows a side view of a piston having my piston rings attached thereto; Figure 2 a vertical section through the same; Figure 3 an enlarged detail view of a portion of said piston; and Figure 4 an enlarged detail view of a portion of a single ring element. While I have shown only the preferred form of the invention, it should be understood that various changes or modifications may be made within the scope of the claims hereto attached without departing from the spirit of the invention.

The piston (1) is adapted to reciprocate in the cylinder (2) and adapted to be actuated in a manner well known in the art by means of an explosive charge bearing on the top of the piston. To prevent the charge from leaking past the piston rings (3) and (4) are provided in annular grooves (6) and (7) preferably provided near the top of the piston. The upper groove (6) is constructed in the usual manner while the lower groove (7) communicates with a plurality of ports (8) extending into the interior of the piston. The two rings, while constructed along similar principles, are distinguished in their function in so far as the upper piston ring is designed for holding compression principally, while the lower piston ring is designed for carrying off a lubricant or whatever other substance may collect on the inside wall of the cylinder into the inside of the piston, whereby the same is returned to the crank case of the internal combustion engine.

Both of the piston rings are made of three annular ring elements (9), (11) and (12). All three elements are triangular in cross section and when assembled form a piston ring rectangular in cross section, and adapted to fill the rectangular groove. The central element (9) is preferably made equilateral in cross section, and its base (13) is coextensive with and engages the bottom of the groove while the two sides (14) and (16) meet at the apex (17) at a point substantially on line with the surface of the piston. The two other ring elements (11) and (12) form preferably right angular triangles in cross section with their hypotenuses engaging the sides of the central element, while their sides (18) engage the sides of the groove and their sides (19) are flush with the surface of the piston. All three ring elements are split in suitable places as shown at (21) in the customary manner to allow of expansion of the same.

The features thus far described are common to both piston rings but the lower piston ring differs from the upper piston ring in so far as the central element (22) of the lower piston ring is provided with a plurality of grooves (23) as shown in Figure 4 arranged in the two sides of the same, preferably in staggered relation. The side elements of the lower piston ring are also preferably made slightly smaller than the side elements of the upper piston ring so that slightly more space is left between the three elements of the former piston ring. Without wishing to confine myself to actual measurements, I might say that the distance between the engaging faces of the upper piston ring is preferably made equal to about three one-thousandths of an inch, while the same distance in the lower piston ring is preferably about one one-hundredth of an inch.

The operation of the piston rings is as follows: The lower piston ring serves mainly to scrape the oil or other substance that collects on the inside wall of the cylinder on a downward motion as well as on an upward motion, and to guide the said substance through the grooves (23) and the perforations (8) in the piston to the inside of the latter, whereby the larger part of said lubricant or other substance is returned to the crank case, without being allowed to pass the piston and to collect in the combustion chamber. A slight amount of lubricant left by the lower piston ring will be scraped off by the upper piston ring by the two outside elements of the same, and will be guided into the space between the engaging surfaces. Since these surfaces are inclined the film of substance thus introduced between the same will have a tendency to force the outside elements outwardly and to thereby expand the piston ring so that the latter at all times has a tendency to remain in close contact with the cylinder wall, and to thereby prevent leakage of the products of combustion in the combustion chamber.

I claim:

1. In combination, a piston having an annular groove therein communicating with the inside of the piston, and a piston ring adapted to engage the groove comprising a plurality of ring elements formed with grooves in their contacting faces allowing a liquid to pass between the same to the inside of the piston.

2. In combination, a piston having an annular groove therein communicating with the inside of the piston and a piston ring adapted to engage the groove comprising three ring elements of triangular cross section shaped to form a ring of rectangular cross section when assembled, with the base of one of the ring elements, facing the bottom of the groove and the bases of the two other ring elements facing outwardly, and with transverse grooves in the sides for allowing a liquid to pass between the same to the inside of the piston.

EARL O. WEATHERWAX.